US006631516B1

United States Patent
Baumgart et al.

(10) Patent No.: US 6,631,516 B1
(45) Date of Patent: Oct. 7, 2003

(54) EXTENDED SYNTAX RECORD FOR ASSEMBLER LANGUAGE INSTRUCTIONS

(75) Inventors: Leona Dryden Baumgart, Los Gatos, CA (US); John Robert Ehrman, Sunnyvale, CA (US); Richard E. Lee, deceased, late of Milipitas, CA (US); Barbara Ann Lee, Milipitas, CA (US), legal representative

(73) Assignee: International Business Machines Corporatioin, Armonk, NY (US)

( * ) Notice: Subject to any disclaimer, the term of this patent is extended or adjusted under 35 U.S.C. 154(b) by 0 days.

(21) Appl. No.: 09/558,430

(22) Filed: Apr. 25, 2000

(51) Int. Cl.[7] .............................. G06F 9/44; G06F 9/45
(52) U.S. Cl. ....................................... 717/143; 717/162
(58) Field of Search ................................ 717/106, 130, 717/136, 140, 141, 142, 143, 162

(56) References Cited

U.S. PATENT DOCUMENTS

| | | | | |
|---|---|---|---|---|
| 5,553,286 A | | 9/1996 | Lee | |
| 5,659,751 A | * | 8/1997 | Heninger | 709/332 |
| 5,774,726 A | * | 6/1998 | Ahmed | 717/143 |
| 5,790,861 A | * | 8/1998 | Rose et al. | 717/145 |
| 5,933,641 A | * | 8/1999 | Ma | 717/143 |
| 5,999,733 A | * | 12/1999 | Shamoto | 717/143 |
| 6,041,180 A | * | 3/2000 | Perks et al. | 717/151 |
| 6,077,315 A | * | 6/2000 | Greenbaum et al. | 717/157 |
| 6,149,318 A | * | 11/2000 | Chase et al. | 717/131 |

OTHER PUBLICATIONS

Neal Glew and Greg Morisett, Type–Safe Linking and Modular Assembly Language, 1999 [retrieved Oct. 17, 2002]. Retrieved from the internet<URL:http://citeseer.n-j.nec.com/glew99typesafe.html>, pages.*
John K. Levine, Linkers and Loaders, Oct. 11, 1999, Morgan Kaufmann Publishers, pp. 2, 7 and 205.*
Gregory Satir, "C++: The Core Language", 1995, O'Reilly and Associates, pp. 3, 22, 31, 66, 68, 90, and 96.*
L. Presser, et al., "Linkers and Loaders", 09/72, Computing Surveys, vol. 4, No. 3, pp. 149–167.
IBM Manuel, "High Level Assembler for MVS & VSM", Language Reference MVS and VM, Release 2, 3/95, pp. 131–138.

* cited by examiner

*Primary Examiner*—Todd Ingberg
(74) *Attorney, Agent, or Firm*—David W. Victor; Konrad, Raynes, Victor & Mann LLP

(57) ABSTRACT

Disclosed is a method, system, and information bearing medium for associating attribute information with symbols. A command is processed associating user specified attribute information with a symbol definition or reference. The user specified attribute information is added to an object file including the symbol definition or reference. The attribute information may then be used to determine compatibility when resolving references to the symbol. Further, the user specified attribute information may also be associated with an address constant.

45 Claims, 2 Drawing Sheets

EXTENDED SYNTAX RECORD FOR ASSEMBLER LANGUAGE INSTRUCTIONS

CROSS-REFERENCE TO RELATED APPLICATIONS

This application is related to the following co-pending and commonly-assigned application Ser. No. 09/558,430, filed on same date herewith, by Leona Baumgart, John Ehrman, and Dick Lee, entitled "Extended Attribute Information File Format for Object Files".

BACKGROUND OF THE INVENTION

1. Field of the Invention

The present invention relates generally to assembler language instructions that declare external symbols as definitions and references and, in particular, to the association of descriptive information with instructions that define and reference external symbols for use in determining whether a definition of and a reference to an external symbol are compatible.

2. Description of the Related Art

Programmers write computer programs in languages such as assembler language, COBOL, FORTRAN, C, C++, etc. A group of statements written in such a language is referred to as a source module. Before the source module can be executed, the source statements within the source module must be transformed to machine readable executable code.

An assembler or compiler, referred to herein as a source translator, translates the source module into an object module, which includes machine readable executable code, data, external symbols, address constants, and further bookkeeping information used in the process of transforming the object module into an executable file. A linkage editor combines one more object modules into a load module in preparation for execution. Typically, the object modules being combined by the linkage editor contain a single definition of an external symbol, and one or more references to the symbol. If one object module includes a reference to an external symbol defined in another object module, then the linkage editor may resolve this reference to the definition in the load module.

Often, the source translator disregards descriptive information about external symbols included in the source module when generating the object module, typically because there is no mechanism for including such descriptive information in the object module. As a result, object modules and load modules often include little or no information on the attributes of external symbols. Furthermore, in the prior art, assembler language instructions, such as the ENTRY, CSECT, EXTRN, and DC instructions in the IBM assembler language, did not include descriptive information about the attributes of the symbols used as operands in the assembler language instructions. These and other specific aspects of assembler language discussed herein are described in the publication "High Level Assembler for MVS & VM & VSE, Language Reference," Release 3, Document Number SC26-4940-02, IBM Corporation, which publication is incorporated by reference herein in its entirety.

Generally, the source module and object module include one or more control sections. A control section is the smallest subdivision of a program that can be relocated as a unit. At coding time, the programmer creates control sections in the source modules, establishes the addressability of each control section, and establishes symbolic linkages between control sections that lie in different source modules.

The programmer establishes symbolic linkages by declaring an external symbol in one source module to reference a control section or an entry point defined within another object module. Source modules external to a module in which an external symbol is defined can reference the text at the location identified by the external symbol. In this way, the external symbol is the vehicle used for establishing symbolic linkages between programs.

In the IBM assembler language, the programmer can use the ENTRY, CSECT, COM, DXD, RSECT, and START instructions to define external symbols in the source module. The ENTRY instruction defines the external symbol as the location where the the symbol named in the ENTRY instruction is placed. For instance, the instruction ENTRY B declares the external symbol B as the point within the control section where the symbol B is defined.

The CSECT instruction identifies a control section name as an external symbol. For instance, the instruction B CSECT names the control section B, thereby allowing external source modules to reference the control section identified by the external symbol B. The programmer can declare external symbols in a source module that are not defined in that module using the EXTRN instruction. A declared symbol can be used in instruction operands within that source module. For instance, the instruction EXTRN C declares that the external symbol C will be defined in a different source module, and may be referenced from the source module containing the EXTRN instruction.

Symbols can have two types of attributes, inherent (or implicit or intrinsic) and extended (descriptive). Inherent attributes are attributes that are typically part of a fixed set of properties associated with an external symbol. Examples of inherent attributes of a symbol include: addressing mode (AMODE, which implicitly designates the symbol as naming executable code); and residency mode (RMODE, which implicitly designates a region of storage where the object named by the symbol must reside). Descriptive or extended attributes are additional information either derived from the program's language statements or provided by other means. Examples of descriptive attributes include: whether an external symbol reference is to data (and what data types and structures) or to executable code (and what numbers and types of arguments are being passed); whether an external symbol definition is for data (and what data types and structures) or for executable code (and what expected number and types of arguments are to be received).

One of the shortcomings of current methods for using external symbols is that the instructions identifying the symbols do not retain attribute information on the declaration of the symbols, nor do they provide any means for declaring additional attributes. This lack of information makes it difficult for the programmer to debug incompatibility errors that arise if an instruction referencing the symbol (such as EXTRN) is incompatible with an instruction defining that symbol (such as ENTRY or CSECT).

For example, if the external symbol is defined as a location naming code, but the reference to the symbol expects data, then an incompatibility error may arise. An incompatibility error may also arise if the reference is compatible with only 24-bit addressing and the symbol is defined as using only 31-bit addressing. These incompatibility errors could prevent the program from properly executing.

Thus, there is a need in the art for techniques for associating descriptive information with symbols that can be used during binding to check the compatibility of references to symbols.

SUMMARY OF THE INVENTION

The present invention is directed to a method, system, and information bearing medium for associating attribute information with symbols. A command is processed associating user specified attribute information with a symbol definition or reference. The user specified attribute information is added to an object file including the symbol definition or reference. The attribute information may then be used to determine compatibility of the symbol when resolving references to the symbol.

In further embodiments, the user specified attribute information is associated with an address constant.

The attribute information may indicate attributes including linkage, scope, direct or indirect reference, conformance level, association of code and data areas, as well as user specified extended information.

Preferred embodiments provide a technique for assigning attribute information to a symbol that may be maintained with the symbol in the object file and used for compatibility checking purposes to provide the programmer a greater definition of compatibility and control. Providing a greater degree of compatibility at different user specified levels increases the types of fixes and patches that may be provided to correct incompatibility errors because the extended attribute information may be used to diagnose the source of the incompatibility at a finer level of detail and then determine the appropriate correction operation that specifically addresses the compatibility problem.

DETAILED DESCRIPTION OF PREFERRED EMBODIMENTS

In the following description, reference is made to the accompanying drawings which form a part hereof, and in which is shown by way of illustration embodiments of the invention. It is understood that other embodiments may be utilized and structural changes may be made without departing from the scope of the present invention.

Computing Environment

Figure 1:
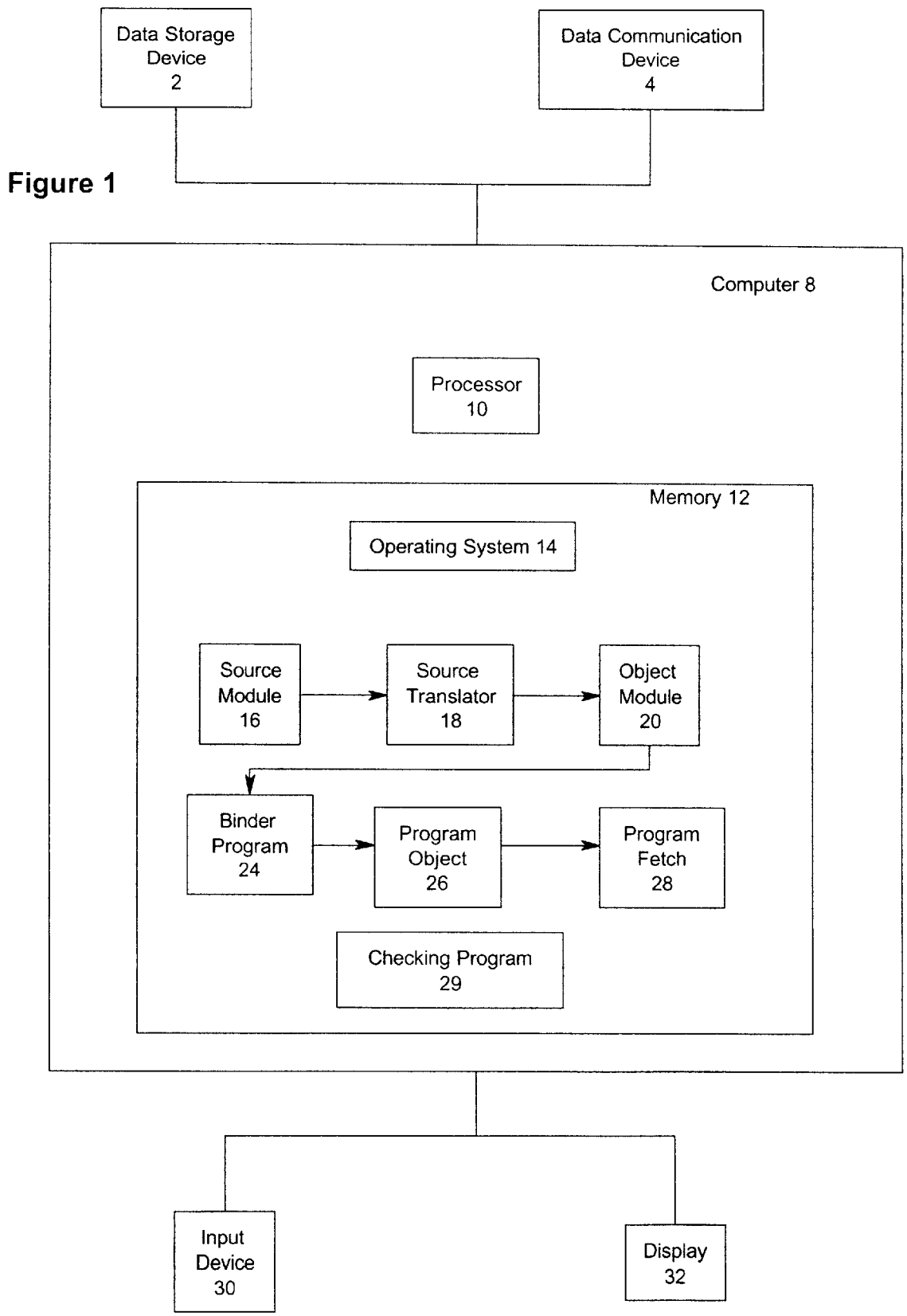
FIG. 1 is a block diagram illustrating an exemplary hardware environment and programs stored in memory in accordance with the present invention.

FIG. 1 is a block diagram illustrating an exemplary hardware environment used to implement the preferred embodiments of the present invention. In the exemplary hardware environment, a computer 8 may include, inter alia, a processor 10, memory 12 (e.g., random access memory (RAM)), an input device 30 (e.g., keyboard, mouse pointing device, voice activated input device, etc.), display 32 (e.g., CRT, LCD displays, etc.), as well as a data storage device 2 (e.g., hard, floppy, and/or CD-ROM disk drives, etc.), and/or data communication device 4 (e.g. modems, network interfaces, etc.). It is envisioned that attached to the computer 8 may be other devices such as a read only memory (ROM), a video card, bus interface, printers, etc. Those skilled in the art will recognize that any combination of the above components, or any number of different components, peripherals, and other devices known in the art, may be used with the computer 8.

The computer 8 operates under the control of an operating system (OS) 14, such as OS/390, MVS, VM, VSE, OS/2, AIX, UNIX, WINDOWS, MACINTOSH, ** etc. The operating system 14 is booted into the memory 12 of the computer 8 for execution when the computer 8 is powered-on or reset. In turn, the operating system 14 then controls the execution of one or more computer programs, including a source translator 18, binder program 24, a program fetch 28 program, and a checking program 29. These programs 18, 24, 28, and 29 process a source module 16, an object module 20, and a program object 26 to generate a final executable file which is loaded into memory. The present invention is generally implemented in these data objects 20 and 26, and in these computer programs 18, 24, 28, and 29 which execute under the control of the operating system 14 and cause the computer 8 to perform the desired functions as described herein. Alternatively, the present invention may be implemented in the operating system 14 itself.

The source translator 18 program, which usually is a compiler or assembler, analyzes the source module 16 loaded into the memory 12. The source module 16 is generally stored in a text file on the data storage device 2, and/or entered interactively by a programmer from the input device 30. The source translator 18 synthesizes an object module 20 from the source module 16. The binder program 24 receives as input one or more object modules 20 or a combination of object modules 20 and program objects 26, and produces a program object 26 as output. The program fetch 28 loads the executable text from the program object 26 into memory 12 for execution by the processor 10. This process of binding and loading text into memory is described in detail in "Linkers and Loaders," by Leon Presser and John R. White, ACM Computing Surveys, Vol. 4, No. 32, September 1972, pp. 149–167, which is incorporated herein by reference in its entirety.

The operating system 14, source module 16, source translator 18, object module 20, binder program 24, program object 26, program fetch 28, and checking program 29 are all comprised of instructions and data which, when read, translated, and executed by the computer 8, cause the computer 8 to perform the steps necessary to implement and/or use the present invention. Generally, the operating system 14, source module 16, source translator 18, object module 20, binder program 24, program object 26, program fetch 28, and checking program 29 are all tangibly embodied in and/or readable from a device, carrier or media, such as memory 12, data storage device 2, and or data communications device 4. Under control of the operating system 14, the programs 18, 16, 20, 24, 26, 28, and 29 may be loaded from memory 12, data storage device 2 and/or data communications device 4 into the memory 12 of the computer 8 for use during actual operations. The term program as used herein refers to human readable source code as well as machine readable code.

Those skilled in the art will recognize that the exemplary environment illustrated in FIG. 1 is not intended to limit the present invention. Indeed, those skilled in the art will recognize that other alternative hardware environments and programs may be used without departing from the scope of the present invention.

Object Modules

Figure 2:
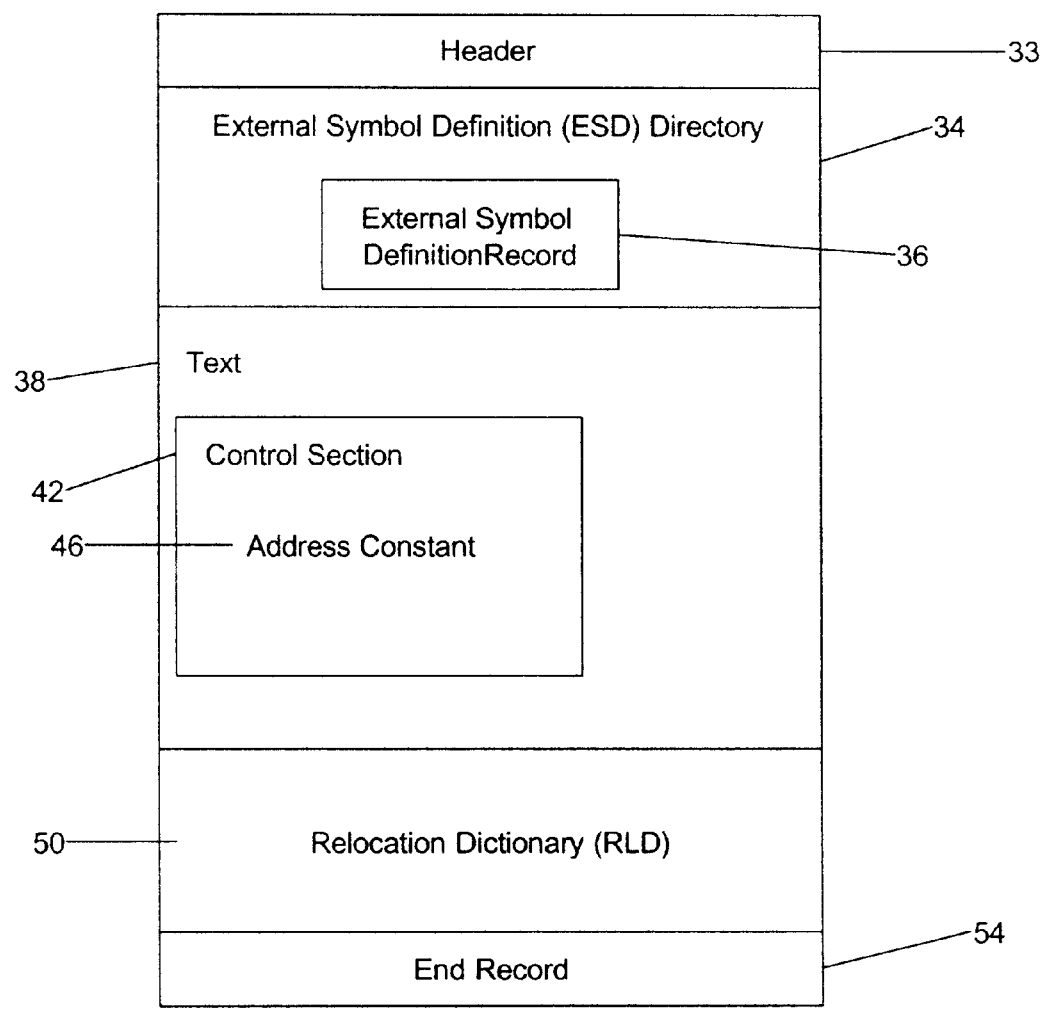
FIG. 2 is a block diagram of fields included in an object module in accordance with the present invention.

As discussed, the source translator 18 translates the source module 16, which can include assembler language instructions, into object module 20. FIG. 2 shows a preferred embodiment of the records in an object module 20, including an external symbol directory (ESD) 34, one or more control sections 42, and one or more address constants 46.

Co-pending and commonly assigned patent application entitled "Extended Attribute Information File Format for Object Files," application Ser. No. 09/558,430, which was incorporated by reference above, further describes the format of the object module 20 and how extended attribute information is retained therein.

The external symbol directory (ESD) 34 includes an external symbol record (ESD) 36 for each symbol definition or reference declared in the object module 20. During binding of an object module 20 with one or more object modules 20 or program objects 26, the binder program 24 creates a combined external symbol directory (CESD) within the resulting program object 26 which includes the external symbols from those object modules and program objects included in the binding.

During binding, an external reference is said to be resolved if one object module 20 or program object 26 involved in the binding includes a reference to a symbol (a reference declaration), and another object module 20 or program object 26 involved in the binding defines that symbol (the definition declaration). The combined external symbol directory (CESD) includes just one entry for each definition of an external symbol. All references to the symbol in the combined program object 26 now reference this definition. When an external reference is resolved, the value of the external symbol referenced by an address constant can be relocated into the location of the address constant.

If an external symbol referenced in an object module 20 or program object 26 is not resolved with the definition of that symbol, then the external symbol directory 34 retains the external symbol as an unresolved external reference. Typically, all external references must be resolved before the program object 26 can be executed. This may be accomplished by referring to a call library containing definition values for external references.

Each object module 20 includes at least one or more control sections (CSECTS) 42. As discussed, a control section 42 is a unit of text that is the basic indivisible unit of linking. Although all elements of a single control section 42 are loaded and executed in a constant relationship with each other, an individual control section can be relocated independently of other control sections at load time without altering the operating logic of the program. As discussed, the CSECT instruction is used to provide an external symbol name to a control section 42.

The object module 20 may also include an address constant 46 in a control section 42 which defines a location within the text whose value is usually not known during translation of the source module 16. In the IBM assembler language, an address constant 46 is defined with a DC instruction, wherein the DC instruction is also used to define data constants. Address constants 46 can be relocated to contain the addresses of data and code. The location of the address constant 46 in the text is where the value of the referenced symbol will be relocated. The value of the item represented by the symbol is relocated into the address constant 46 during or before program execution. Operations may also be performed on the items referenced by the address constant 46 as discussed in commonly-assigned patent application entitled "System and Method Using Extended Relocation Types and Operations in Relocating Operations," by Leona Baumgart, John Ehrman, and Dick Lee, filed on Sep. 8, 1999 and having application Ser. No. 09/392,128, which application is incorporated by reference herein in its entirety.

Extended Syntax for Instructions

Preferred embodiments associate fixed and extended attribute information with instructions that declare definitions of and references to external symbols. This attribute data provides descriptive information on the attributes of the symbol declared by the assembler language instructions. In preferred embodiments, the extended attribute record may be associated with the IBM assembler language definition instructions XATTR, COM, ENTRY, CSECT, RSECT, START, DSECT and DXD and the symbol reference declaration instructions XATTR, EXTRN, XTRN, and DC, or any other instructions which declare, define, or reference external symbols.

Preferred embodiments add a new statement XATTR to the assembler language:

symbol XATTR attributes, . . .

One or more operands are allowed. For example:

AA XATTR SCOPE(EXPORT),EXECUTABLE could declare that AA has export scope, and names or refers to code. This method of declaration can accommodate a wide range of "fixed" attributes such as the above, as well as a mechanism for declaring application-specific, program-specific, or symbol-specific "extended" attributes.

The XATTR command may be used to assign many different types of attributes to constants and symbols that can be used for debugging purposes and compatibility checking. Below are examples of ways to declare various types of attribute information.

1. Linkage Attributes

A linkage attribute defines the conventions used to pass data or arguments between programs. Such conventions define the location of registers, argument passing mechanisms, and status preservation mechanisms involved when passing arguments and data between a calling program and the called program. The calling program uses the status information after the called program returns to the calling program to resume execution. Status of the calling program must be maintained and when the called program returns data, must be able to reestablish status and environment that calling program needs when control returns to calling program.

An example of calling conventions include operating system (OS) and extra performance linkage (XPLINK). The OS linkage convention indicates that the register that has the address of the entry point is register 15 and the return address is register 14, a pointer to save area for status information is register 13, and a pointer to a list of pointers each of which has the address of an argument for the called routine is in register 1. The XPLINK convention provides different register locations for status and other convention information used when passing arguments and values to achieve similar results.

The XATTR command can be used to associate linkage information with a symbol indicating the linkage convention used by that symbol as follows:

symbol XATTR LINKAGE(OS|XPLINK)

The symbol must have been declared implicitly or explicitly as an external symbol prior to adding the extended attribute information.

An entry point is the point at which the called routine receives control. The XATTR command can be used to declare linkage attributes associated with the called routine's entry point. For instance, an entry point can be declared with the XPLINK attribute as follows:

ENTRY MYENT1

MYENT1 XATTR LINKAGE(XPLINK)

Still further, an external entry point may be declared with the XPLink attribute as follows:

EXTRN HISENT2
HISENT2 XATTR LINKAGE(XPLINK)

2. Scope Attribute

Scope attributes define how widely should the binder search for names to resolve references that are not already resolved from the object stream, i.e., whether to look at a section, module or library to resolve certain references and definitions. Binding scopes may have four values: Section, Module, Library, or Export. For instance, the scope information may be declared as follows:

SCOPE(S|SECTION)
SCOPE(M|MODULE)
SCOPE(L|LIBRARY)
SCOPE(X|IMPORT|EXPORT)

3. Reference Attribute

When control is passed from one program to another, either the called code may always be available or further intermediary operations may need to be performed before control can be passed, such as having to load additional code into storage. An indirect reference indicates that helper or linkage assist code may be needed before control passes to the reference symbol. A direct reference indicates that control can pass immediately to the entry point without any further operations. Thus, with an indirect reference, intermediary steps may be necessary, but are not necessarily needed.

Below is an example of using the XATTR function to declare indirect and direct reference attributes as extended attributes.

X1 XATTR REFERENCE(INDIRECT)
X2 XATTR REFERENCE(DIRECT)

4. Code vs. Data ("Executability"):

In many cases, to ensure proper execution, it is important to know whether a module or area being accessed contains code or data. For instance, if an entry point declared in a routine that contains code is referenced in another routine, then the external routine referencing the entry point must be accessing code, not data, otherwise errors could occur. Thus, attribute information can be used to avoid the situation where a calling routine references data when it is intending to reference code, and vice versa. Below is an example of assigning attribute information indicating whether a symbol is code or data:

X3 XATTR REFERENCE(CODE|DATA)

The definer or referencer declares the type of machine language information named by the symbol X3. The binder could use this information to flag possibly incompatible reference-definition combinations.

5. Conformance vs. Nonconformance

Conformance attribute information can be used to instruct the binder at bind time to check the attributes of references and definitions to ensure they conform. One level of conformance may require that all attributes are identical, another level may require that only some attributes are identical, and still another level may require that certain mismatches do not occur. Nonconformance would permit incompatibility. Thus, the conformance attribute information specifies the level of checking that is required during compatibility checking. If the attribute information specifies conformance and there is nonconformance, then the binder can take corrective action, such as inserting extra code. For instance, if a reference to a symbol uses OS linkage and the definition uses XPLINK conventions, then at bind time the binder or some binder agent could insert extra code to convert from one to the other to repair incompatibility.

Below is an example of how conformance/nonconformance attribute information may be specified:

X4 XATTR REFERENCE(CONFORM|NOCONFORM)

6. Association of Code and Data Areas

In multi-tasking or multi-processing environments, multiple processors may simultaneously execute the same code. In such cases, it is important to ensure that no processor changes the code that other processors intend to use, else one processor can adversely affect the operations of another processor. To ensure that the commonly used code is not altered, each processor will have its own, non-shared work areas to use when executing the shared code. In this way, the shared code is not affected by the manipulations of the code and data in the non-shared work areas.

The non-shared work area of a processor is referred to as a prototype control section (PSECT). In preferred embodiments, the XATTR command may be used to associate a shared symbol or name of the shared program with the name of the non-shared work area which will contain a copy of the non-shared work area associated with the shared program. Below is an example of how the XATTR command is used to establish a relationship between the shared code and the non-shared PSECT or work area of a processor.

symbol1 XATTR PSECT(symbol2)

Symbol1 identifies the shared code segment and symbol2 identifies the PSECT associated with the code. In preferred embodiments, only a symbol (no expressions, no arithmetic expressions) is allowed as the symbol2 operand and neither symbol1 nor symbol2 may be a Class name. The operating system could use this assigned PSECT attribute information to find the non-shared PSECT for the shared code (symbol1) and to place a copy of the non-shared work area for the processor to use. In this way, the XATTR statement establishes a relationship between the shared program named by symbol1 and the non-shared work area named by symbol2 for the operating system to use when trying to locate the non-shared work area (symbol2) for the shared code (symbol1).

Extended Attribute Information

Preferred embodiments further provide an extension mechanism using the XATTR command to allow programmers to provide personalized detailed and specific attribute information that is included in the text of object, but may not be provided to the binder during binding. For instance, the programmer may want to associate attribute information with data being passed for that particular reference. If the data being passed is a number, then the programmer could specify the type of value, e.g., a velocity value, time value, etc. This information could be used during bind time or execution time to determine whether the type of value is compatible with the type of value the calling program or reference is expecting.

Below is an example of how extended attribute information may be provided.

symbol XATTR ATTRIBUTES(label)

The symbol "label" may be an internal or external symbol and is known to the declaring program. "Label" names the location of the attribute information to be associated with the declared symbol. The information itself is encoded as ordinary text: integers, character strings, bit flags, etc. The encoding may be any values known to any other programs that intend to use the extended attribute information for its purposes, and allows retention of attribute information not encoded as "fixed" attributes.

For example, suppose the symbol BB has descriptive attributes which are encoded starting at label BB_ATTR:

|     |                            |                               |
| --- | -------------------------- | ----------------------------- |
|     | ENTRY BB                   | \\Declare BB as an entry point |
| BB  | SAVE (14,12),*             |                               |
| --- |                            |                               |
| BB  | XATTR<br>Attributes(BB_ATTR) | \\Point to attributes of BB   |
| --- |                            |                               |
| BB_ATTR DC . . .           |  | \\Attribute information for<br>symbol BB |

In the absence of any other class assignments, the text of the attribute information would reside in the same element as BB. In the object file, the attribute information would normally be included in the section referencing the information. Otherwise, section replacement during binding could lose the connection between symbols and their attributes. In this way, the attribute information is available to the binder during bind time when the binder is building the program object, and to run time uses of the application as well as to tools such as debuggers.

The attribute information may be placed anywhere in the program object. However, in certain embodiments the attribute information may be part of a special class that is not loaded with the program during execution. This would make the attribute information available on demand but not part of the executable code so that the attribute information does not affect execution. For instance, the program object may maintain the executable code in one segment and attribute information in another segment, so that during execution only executable code gets loaded, but attribute information does not get loaded until requested.

Address Constant Attributes

In preferred embodiments, attribute information may also be associated with address constants. References to a symbol by address constants may be expecting different types of data. The attribute information can be used with the address constant to ensure compatibility of the type of information provided by the module containing the address constant and what the referenced symbol expects. This allows attribute information to be associated with definitions of and references to external symbols.

Moreover, within a module referring to an external symbol, there may be several different types of references. In fact, a function may be called with differing numbers of arguments at various points within a module. In case the user wants attributes to be assigned to each distinct reference within the module (rather than assigning reference attributes once per module), the assembler supports a method for assigning extended attribute information to individual address constants (adcons).

Below is an example how fixed attribute linkage information may be associated with the address constant DC A(symbol(LINKAGE(OS)))

Such syntax can be used to indicate that this reference to the symbol expects its target to accept OS linkage (and is therefore implicitly "executable").

Similarly, extended attributes can be associated with individual address constants, as in the following example:

DC A(symbol(ATTRIBUTES(label)))

The extended attribute information is found at the statements defined by the symbol "label." Such extended attributes could include the numbers and types of data arguments being passed to the named "symbol" for this particular use of the address constant.

In this way, the same extended attribute-structure definitions could be used for both general symbol (XATTR) and adcon-specific declarations.

Conclusion

This concludes the description of the preferred embodiment of the invention. The following describes some alternative embodiments for accomplishing the present invention.

The preferred embodiments may be implemented as a method, apparatus or information bearing media using standard programming and/or engineering techniques to produce software, firmware, hardware, or any combination thereof. The programs defining the functions of the preferred embodiment can be delivered to a computer via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such signal-bearing media, when carrying computer-readable instructions that direct the functions of the present invention, represent alternative embodiments of the present invention.

Any type of computer, such as a mainframe, minicomputer, work station or personal computer, could be used with the present invention.

In addition, any compiler, assembler, binder program, linking editor, and loader programs, if these other programs use different linking and loading interface conventions, could benefit from the present invention.

Still further, in alternative embodiments, the extended attribute records associated with instructions may include information, data structures, and describe attributes different from the extended attribute records of the preferred embodiments. Further, extended attribute records may be associated with any instructions that declare, reference, and define symbols.

In preferred embodiments, the programmer encodes the information in the extended attribute records when writing the source modules. However, it should be appreciated that in alternative embodiments that the user may encode such information after translation of the source module or the source translator may generate the extended attribute records based on descriptive information included in the source module.

Preferred embodiments described above include separate programs for translating, linking (binding), loading, and checking. However, it should be appreciated that in alternative embodiments the functions performed by these separate program categories may be grouped in one or more programs in a manner different from the grouping of functions discussed above.

Preferred embodiments provided specific examples of types of attribute information, e.g., linkage, scope, conformance, etc. However, the preferred embodiment technique for associating attribute information with symbols or definitions may apply to any type of attribute information.

Preferred embodiments discussed above also describe certain operations occurring at certain times. For instance, external symbols are resolved during binding and address constants are relocated prior to or during execution. Further, the checking of the extended attribute record is described as occurring at certain times. However, it should be appreciated that in alternative embodiments these operations, resolving external symbols, relocating address constants, and checking and comparing the information in extended attribute records to determine compatibility, may occur at any time from translation of the source code to the loading and execution of the executable program into memory.

In summary, preferred embodiments disclose a method, apparatus, and information bearing medium for associating attribute information with symbols. A command is processed associating user specified attribute information with a symbol definition or reference. The user specified attribute information is added to an object file including the symbol definition or reference. The attribute information may then be used to determine compatibility of the symbol when resolving references to the symbol definition. Further, the user specified attribute information may also be associated with an address constant referencing a symbol.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for associating attribute information with symbols, comprising:

processing a command associating user specified attribute information with a symbol definition or reference, wherein the user specified attribute information comprises at least one of fixed attribute information and extended attribute information;

adding the user specified attribute information to an object file including the symbol definition or reference; and using the user specified attribute information to determine compatibility of the symbol when resolving references to the symbol.

2. The method of claim 1, wherein the user specified attribute information indicates linkage conventions associated with a symbol.

3. The method of claim 2, wherein the linkage conventions indicate registers and status information used when calling the symbol from an external program.

4. The method of claim 1, wherein the symbol to which attribute information is associated comprises a definition within the declaring program.

5. The method of claim 1, wherein the symbol to which attribute information is associated comprises a reference to a symbol defined external to the declaring program.

6. The method of claim 1, wherein the user specified attribute information comprises a scope attribute indicating external locations for a binder program to process when resolving references to the symbol, wherein the scope attribute comprises at least one of Section, Module, Library, and Export.

7. The method of claim 1, wherein the symbol comprises code and wherein the user specified attribute information indicates whether the intermediary operations are performed before the code defined by the symbol is passed to a calling program or whether the code defined by the symbol is passed directly to the calling program.

8. The method of claim 1, wherein the command comprises an XATTR command and wherein the user specified attribute information indicates whether the symbol comprises code or data.

9. The method of claim 1, wherein the user specified attribute information indicates a level of conformance checking of user specified attribute information associated with the symbol when resolving references to the symbol.

10. The method of claim 9, wherein the level of conformance checking indicates one of: compatibility of all attribute information associated with the reference and definition of the symbol; compatibility with a limited set of attribute information associated with the reference and definition of the symbol; and compatibility is not required between any attribute information associated with reference and definition of the symbol.

11. The method of claim 1, wherein the attribute information is associated with a first and second symbols, wherein the attribute information indicates that the first symbol comprises code shared by multiple processors and the second symbol indicates a non-shared working space of one processor into which the code comprising the first symbol is loaded.

12. The method of claim 1, wherein the attribute information comprises a reference to a symbol containing user defined attribute information.

13. The method of claim 1, further comprising adding the user specified attribute information into a location of a program object including executable code that is not loaded into memory during execution of the code.

14. The method of claim 1, further comprising:

processing a command associating user specified attribute information with an address constant.

15. The method of claim 14, wherein different user specified information may be associated with different references to the address constant in the module.

16. A system for associating attribute information with symbols, comprising:

means for processing a command associating user specified attribute information with a symbol definition or reference, wherein the user specified attribute information comprises at least one of fixed attribute information and extended attribute information;

means for adding the user specified attribute information to an object file including the symbol definition or reference; and means for using the user defined attribute information to determine compatibility of the symbol when resolving references to the symbol.

17. The system of claim 16, wherein the user specified attribute information indicates linkage conventions associated with a symbol.

18. The system of claim 17, wherein the linkage conventions indicate registers and status information used when calling the symbol from an external program.

19. The system of claim 16, wherein the symbol to which attribute information is associated comprises a definition within the declaring program.

20. The system of claim 16, wherein the symbol to which attribute information is associated comprises a reference to a symbol defined external to the declaring program.

21. The system of claim 16, wherein the user specified attribute information comprises a scope attribute indicating external locations for a binder program to process when resolving references to the symbol, wherein the scope attribute comprises at least one of Section, Module, Library, and Export.

22. The system of claim 16, wherein the symbol comprises code and wherein the user specified attribute information indicates whether the intermediary operations are performed before the code defined by the symbol is passed to a calling program or whether the code defined by the symbol is passed directly to the calling program.

23. The system of claim 16, wherein the command comprises an XATTR command and wherein the user specified attribute information indicates whether the symbol comprises code or data.

24. The system of claim 16, wherein the user specified attribute information indicates a level of conformance checking of user specified attribute information associated with the symbol when resolving references to the symbol.

25. The system of claim 24, wherein the level of conformance checking indicates one of: compatibility of all attribute information associated with the reference and definition of the symbol; compatibility with a limited set of attribute information associated with the reference and definition of the symbol; and compatibility is not required between any attribute information associated with reference and definition of the symbol.

26. The system of claim 16, wherein the attribute information is associated with a first and second symbols, wherein the attribute information indicates that the first symbol comprises code shared by multiple processors and the second symbol indicates a non-shared working space of one processor into which the code comprising the first symbol is loaded.

27. The system of claim 16, wherein the attribute information comprises a reference to a symbol containing user defined attribute information.

28. The system of claim 16, further comprising adding the user specified attribute information into a location of a program object including executable code that is not loaded into memory during execution of the code.

29. The system of claim 16, further comprising:

processing a command associating user specified attribute information with an address constant.

30. The system of claim 29, wherein different user specified information may be associated with different references to the address constant in the module.

31. An information bearing media including code for associating attribute information with symbols, wherein the code is capable of causing a processor to perform:

processing a command associating user specified attribute information with a symbol definition or reference, wherein the user specified attribute information comprises at least one of fixed attribute information and extended attribute information;

adding the user specified attribute information to an object file including the symbol definition or reference; and using the user defined attribute information to determine compatibility of the symbol when resolving references to the symbol.

32. The information bearing media of claim 31, wherein the user specified attribute information indicates linkage conventions associated with a symbol.

33. The information bearing media of claim 32, wherein the linkage conventions indicate registers and status information used when calling the symbol from an external program.

34. The information bearing media of claim 31, wherein the symbol to which attribute information is associated comprises a definition within the declaring program.

35. The information bearing media of claim 31, wherein the symbol to which attribute information is associated comprises a reference to a symbol defined external to the declaring program.

36. The information bearing media of claim 31, wherein the user specified attribute information comprises a scope attribute indicating external locations for a binder program to process when resolving references to the symbol, wherein the scope attribute comprises at least one of Section, Module, Library, and Export.

37. The information bearing media of claim 31, wherein the symbol comprises code and wherein the user specified attribute information indicates whether the intermediary operations are performed before the code defined by the symbol is passed to a calling program or whether the code defined by the symbol is passed directly to the calling program.

38. The information bearing media of claim 31, wherein the command comprises an XATTR command and wherein the user specified attribute information indicates whether the symbol comprises code or data.

39. The information bearing media of claim 31, wherein the user specified attribute information indicates a level of conformance checking of user specified attribute information associated with the symbol when resolving references to the symbol.

40. The information bearing media of claim 39, wherein the level of conformance checking indicates one of: compatibility of all attribute information associated with the reference and definition of the symbol; compatibility with a limited set of attribute information associated with the reference and definition of the symbol; and compatibility is not required between any attribute information associated with reference and definition of the symbol.

41. The information bearing media of claim 31, wherein the attribute information is associated with a first and second symbols, wherein the attribute information indicates that the first symbol comprises code shared by multiple processors and the second symbol indicates a non-shared working space of one processor into which the code comprising the first symbol is loaded.

42. The information bearing media of claim 31, wherein the attribute information comprises a reference to a symbol containing user defined attribute information.

43. The information bearing media of claim 31, further comprising adding the user specified attribute information into a location of a program object including executable code that is not loaded into memory during execution of the code.

44. The information bearing media of claim 31, wherein the code further causes the processor to perform:

processing a command associating user specified attribute information with an address constant.

45. The information bearing media of claim 31, wherein different user specified information may be associated with different references to the address constant in the module.

* * * * *